(12) United States Patent  
Florin et al.

(10) Patent No.: US 7,894,653 B2  
(45) Date of Patent: Feb. 22, 2011

(54) AUTOMATIC ORGAN DETECTION USING MACHINE LEARNING AND CLASSIFICATION ALGORITHMS

(75) Inventors: Charles Florin, Trenton, NJ (US); James Williams, Nürnberg (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 953 days.

(21) Appl. No.: 11/747,961

(22) Filed: May 14, 2007

(65) Prior Publication Data

US 2008/0154565 A1 Jun. 26, 2008

Related U.S. Application Data

(60) Provisional application No. 60/808,011, filed on May 23, 2006.

(51) Int. Cl.  
*G06K 9/00* (2006.01)

(52) U.S. Cl. .............. 382/131; 382/128; 382/130; 382/132; 382/134; 600/407; 600/425; 600/443; 600/447

(58) Field of Classification Search .......... 600/437, 600/443, 436; 382/131, 130, 128, 134, 132, 382/133, 276  
See application file for complete search history.

(56) References Cited

U.S. PATENT DOCUMENTS

| | | | |
|---|---|---|---|
| 4,579,121 A | 4/1986 | Macovski | |
| 6,393,090 B1 | 5/2002 | Hsieh | |
| 6,628,984 B2 * | 9/2003 | Weinberg | 600/436 |
| 6,970,585 B1 * | 11/2005 | Dafni et al. | 382/131 |
| 7,133,546 B2 | 11/2006 | Dehmeshki | |
| 7,139,601 B2 | 11/2006 | Bucholz | |
| 7,177,453 B2 * | 2/2007 | Suryanarayanan et al. | 382/128 |
| 7,190,364 B2 | 3/2007 | Engel | |
| 7,206,440 B2 * | 4/2007 | August | 382/131 |
| 2005/0144149 A1 * | 6/2005 | Li et al. | 706/12 |
| 2007/0055153 A1 * | 3/2007 | Simopoulos et al. | 600/437 |

* cited by examiner

*Primary Examiner*—Wesley Tucker  
*Assistant Examiner*—Nancy Bitar  
(74) *Attorney, Agent, or Firm*—Donald B. Paschburg

(57) ABSTRACT

A method and apparatus of visually depicting an organ, having the steps of choosing a predefined set features for analysis, the predefined set of features having distinguishing weak learners for an algorithm, wherein the predefined set of features and the weak learners chosen distinguish features of the organ desired to be represented, developing a strong classifier for the algorithm for the organ desired to be represented based upon the weak learners for the organ, one of conducing a body scan to produce a body scan data set and obtaining a body scan data set of information for a patient, applying the strong classifier and the algorithm to the body scan data set to develop a result of a representation of the organ and outputting the result of the step of applying of the strong classifier and the algorithm to the body scan data set to represent the organ.

18 Claims, 4 Drawing Sheets

AUTOMATIC ORGAN DETECTION USING MACHINE LEARNING AND CLASSIFICATION ALGORITHMS

CROSS-REFERENCE TO RELATED APPLICATIONS

This is a United States non-provisional application of U.S. provisional patent application Ser. No. 60/808,011 filed May 23, 2006 by Charles Florin and James P. Williams, the entirety of which application is incorporated by reference herein.

FIELD OF THE INVENTION

The present invention relates to scanning methods and apparatus for medical devices. More specifically, the present invention relates to scanning methods and apparatus used to analyze two dimensional and three dimensional medical image scans and data resulting from such image scans to automatically determine and represent user specified organs for medical evaluation.

BACKGROUND INFORMATION

The complexity of the interior of the human body provides significant challenges for physicians and technicians who wish to evaluate the body for medical purposes. As the human body is complex in its construction, evaluation of the body by medical imaging is difficult, if not impossible, by conventional imaging systems as these systems lack the ability to automatically differentiate between different organs in the body. Physical features of an individual person's anatomy, such as heart vessels, are different than liver vasculature which in turn are different than, for example, a femoral artery. Current medical imaging systems, however, cannot automatically detect and represent a user specified organ within a body because some anatomical features of organs have physical similarities between tissues, thus confusing the interpretation of data received. Such conventional systems, rather, are prone to significant error in their scanning results as organs blend together in scans as the difference in structure cannot be fully ascertained. As a result, such conventional systems cannot be used for detailed scanning of a patient or in critical medical cases where specific details on anatomy are necessary. These conventional systems lack sufficient resolution for detailed analysis by physicians and technicians resulting in the physician taking repetitive scans to try to obtain a best possible differentiated result. Conventional systems are often specifically designed for individual organs in an attempt to limit the error causing aspects of these systems. Conventional systems, therefore, abound as the numerous organs of the body each have specialized systems for analysis. Such conventional systems are expensive to manufacture and require specialized training for each individual operating the system.

Conventional systems, as they are specialized, do not have the substantial capability to be programmed for new tasks of automatically scanning individual organs not originally intended to be evaluated in original design and manufacturing of the equipment. These inflexible systems cannot be updated with the latest information related to scanning technologies pertaining to other organs. As a result, these systems have a limited service life and capability.

As the conventional systems have many drawbacks, there is a need to provide a method and apparatus to automatically determine the presence of an organ whereby the similarity of anatomical features of an individual are accurately analyzed.

There is also a need for a method and apparatus to analyze the presence of organs in both three dimensions and in two dimensions in relation to time.

There is also a need for a method and apparatus to provide a single scanning system that will be sufficient to accurately scan multiple organs with sufficient clarity without the need for multiple systems for a patient.

There is a further need for a method and apparatus to provide a single scanning system that will allow for visual interpretation of results allowing doctors and/or technicians to easily evaluate scans.

SUMMARY OF THE INVENTION

It is therefore an objective of the present invention to provide a method and an apparatus to automatically determine the presence of an organ whereby the similarity of anatomical features of an individual are accurately analyzed.

It is also an objective of the present invention to provide a method and an apparatus to detect the presence of organs in both a three dimensions and in two dimensions in relation to time.

It is also an objective of the present invention to provide a method and apparatus for a single scanning system that will be sufficient to accurately scan multiple organs with sufficient clarity without the need for multiple systems for a patient.

It is a further objective of the present invention to provide a single scanning system that will allow for visual interpretation of results allowing doctors and/or technicians to evaluate scans.

The objectives of the present invention are achieved as illustrated and described. An exemplary embodiment of the present invention provides a method of visually depicting an organ, comprising the steps of choosing a predefined set features for analysis, the predefined set of features having distinguishing weak learners for an algorithm, wherein the predefined set of features and the weak learners chosen distinguish features of the organ desired to be represented, developing a strong classifier for the algorithm for the organ desired to be represented based upon the weak learners for the organ, one of conducing a body scan to obtain a body scan data set and obtaining a body scan data set of information for a patient, and applying the strong classifier and the algorithm to the body scan data set to develop a representation of the organ and outputting a result of the applying of the strong classifier and the algorithm to the body scan data set to represent the organ.

In exemplary embodiments of the present invention, the set of features is a set of linear filters, wherein the linear filters can be local binary patterns, linear rectangular filters or intensity histograms.

In a further exemplary embodiment of the present invention, the step of choosing a predefined set features for analysis comprises the steps of selecting a filter based on the organ of interest, and selecting a weak classifier associated with the filter.

In a still further exemplary embodiment of the present invention, the method is accomplished such that the step of applying the strong classifier and the algorithm to the body scan data set to develop a representation of the organ is conducted on a two dimensional data set developed from the body scan data set. The method may also be accomplished such that the step of applying the strong classifier and the algorithm to the body scan data set to develop a representation of the organ is conducted on a three dimensional data set developed from the body scan data set.

In a further exemplary embodiment of the method of the present invention, the algorithm is an Adaboost algorithm. The strong classifier is defined as a weighted sum of the weak learners or the strong classifier is used on three two dimensional plane points.

The method may also be accomplished with the step of inputting the organ to be evaluated using the predefined set of features designated as weak classifiers to develop the strong classifier after the step of developing the strong classifier for the algorithm for the organ desired to be represented based upon the weak classifiers for the organ. Additionally, the organ may include one of carotids, heart vessels, liver vasculature and femoral artery.

The method may also be accomplished such that the representation produces a visual image or that the visual image is a three-dimensional visual image. Alternatively, the visual image may be a two dimensional image changing over time. Additionally, the representation is cropped for visualization in other exemplary embodiments.

The method may also further comprise initializing a segmentation algorithm for analysis of the organ.

The method may also be performed such that the weak classifiers are determined through analysis of one of visual scans of known organs and data scans of known organs as positive indicators.

A second alternative embodiment is also presented. The second embodiment provides a program storage device readable by machine, tangibly embodying a program of instructions executable by the machine to perform method steps for visually depicting an organ, comprising: (a) choosing a predefined set features for analysis, the predefined set of features having distinguishing weak learners for an algorithm, wherein the predefined set of features and the weak learners chosen distinguish features of the organ desired to be represented, (b) developing a strong classifier for the algorithm for the organ desired to be represented based upon the weak learners for the organ, (c) one of conducing a body scan to produce a body scan data set and obtaining a body scan data set of information for a patient, (d) applying the strong classifier and the algorithm to the body scan data set to develop a result of a representation of the organ, and (e) outputting the result of the step of applying of the strong classifier and the algorithm to the body scan data set to represent the organ.

DETAILED DESCRIPTION

Figure 1:
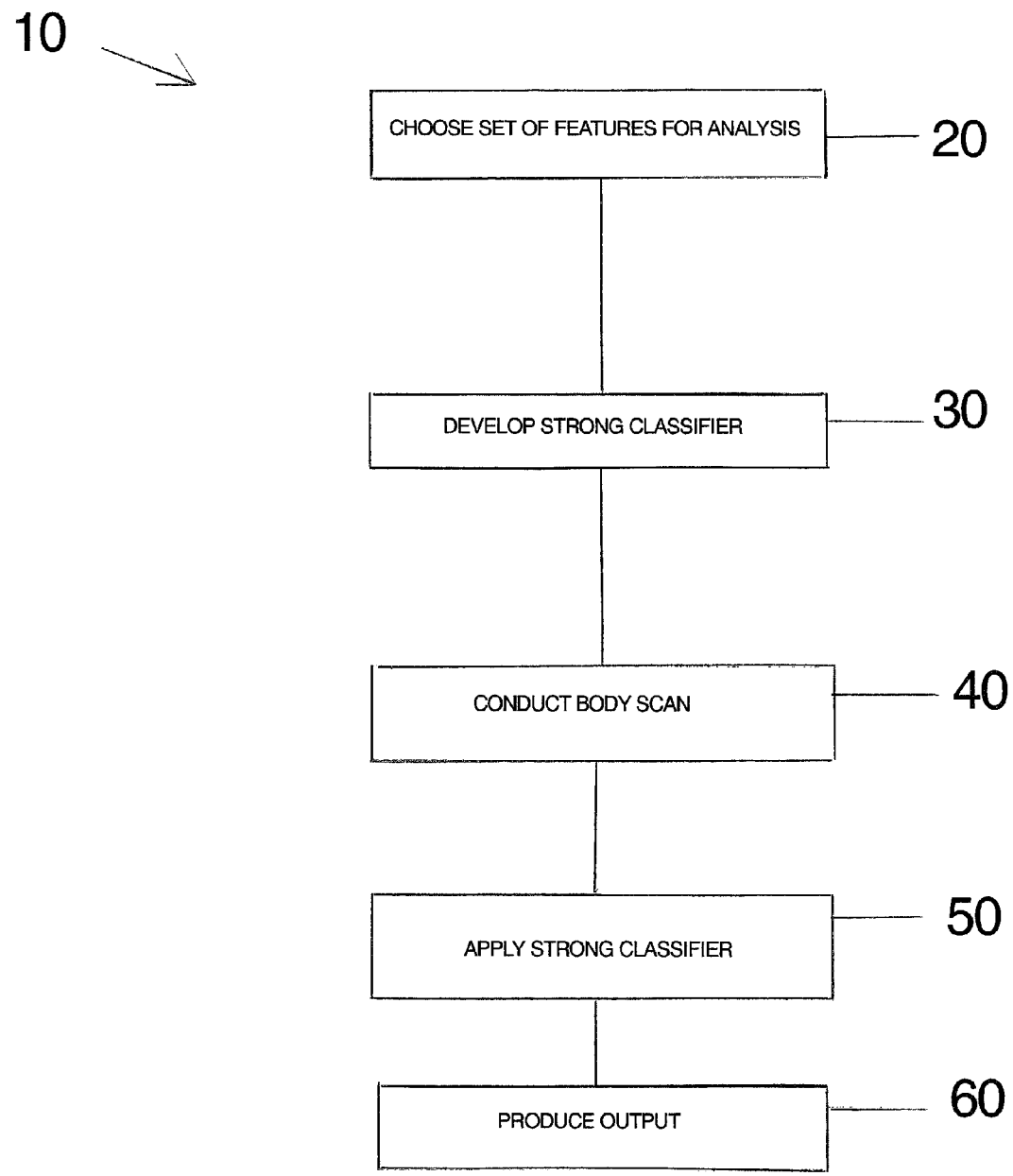
FIG. 1 is a flow chart of an exemplary method of the present invention.
Figure 2:
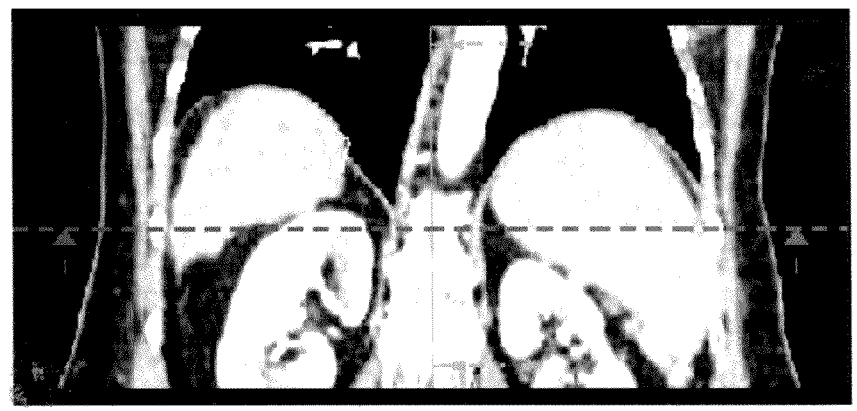
FIG. 2 is a first view of a point in three dimensional space which is defined as the intersection of three orthogonal planes.
Figure 3:
FIG. 3 is a second view of a point in three dimensional space which is defined as the intersection of three orthogonal planes.
Figure 4:
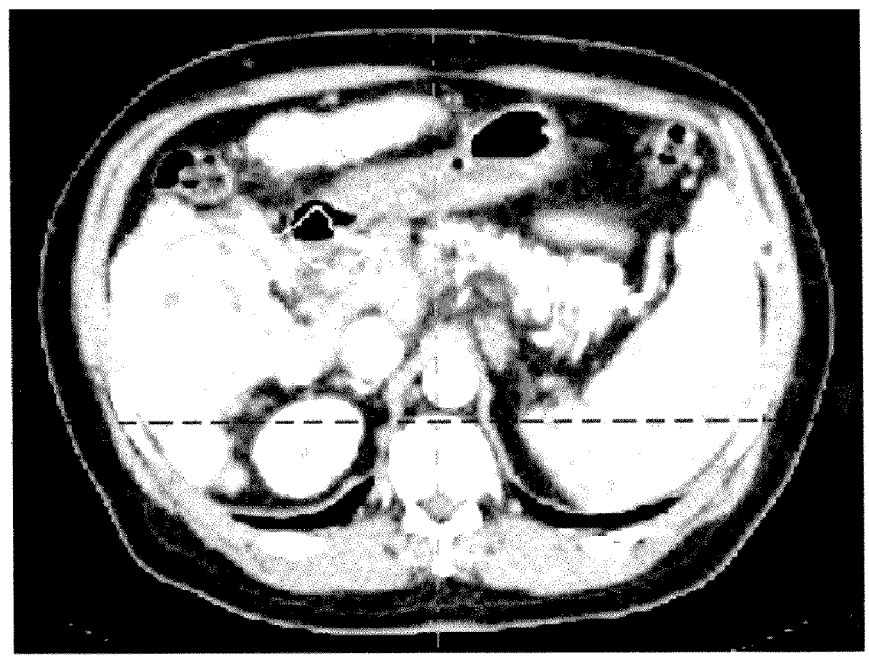
FIG. 4 is a third view of a point in three dimensional space which is defined as the intersection of three orthogonal planes.
Figure 5:
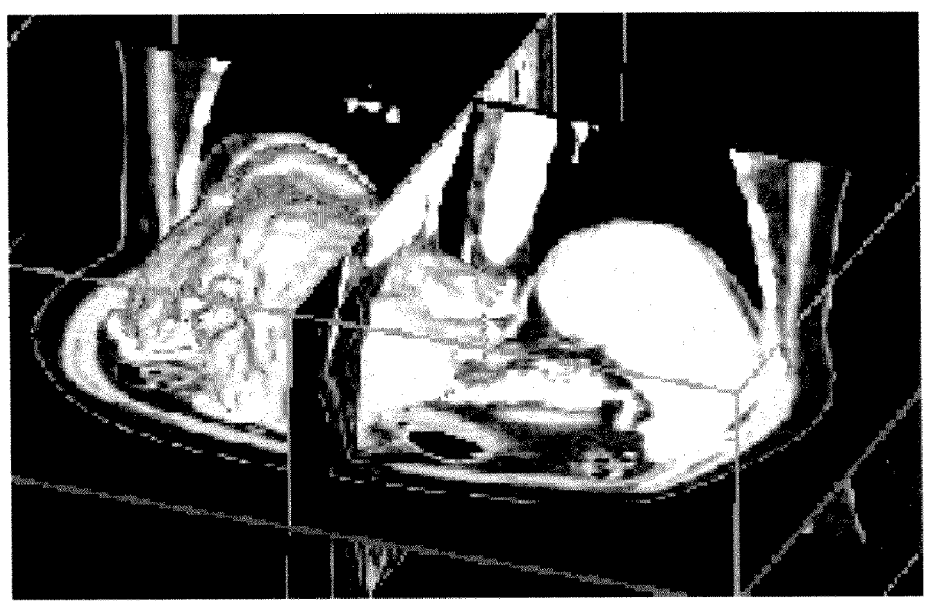
FIG. 5 is a fourth view of a point in three dimensional space which is defined as the intersection of three orthogonal planes.

The present invention relates to automatic organ detection. More specifically, the invention provides for a method and apparatus for processing two dimensional and three dimensional medical images or medical image data sets such that an organ of interest is identified and represented to the physician and/or technician for evaluative purposes. An organ of interest is defined as an organ that is chosen to be evaluated by a medical professional. In the exemplary embodiments provided below, the organs of interest are inside the human body.

Although described as being applicable to human body organ identification, the system and method can also be used on animals other than humans or on sealed containers to identify objects contained therein. The method and apparatus of the present invention allows the organ of interest to be segregated from other tissues that may have similar construction or tissue features, that are not incorporated, however, into the organ of interest. The method allows for high resolution evaluation of data sets previously unable to be evaluated by conventional systems.

The present invention provides both a method and apparatus that allows a user to identify an organ of interest to be evaluated for a patient and then process a medical image scan of a patient, thereby allowing a "real-time" evaluation capability by the physician or technician. Although the method is described for clarity as allowing the user to identify a single organ of interest, the present invention may used in a multi-mode form to identify multiple organs at individual or simultaneous times. Moreover, if multiple organs are selected to be evaluated at the same time, the organs can ultimately be represented spatially in a position that they would occupy while in the body, or they may be evaluated in other positions as necessary.

The organ of interest is, in the present invention, identified by the user. For example, the user may have concerns regarding a specific organ of the body. The medical professional, for example a doctor, inputs the organ to be evaluated into an interface. For the purposes of illustration, the interface is a computer 100 as designated in FIG. 6. The organ of interest is chosen from a menu of organs that the computer 100 is designed to evaluate. In the exemplary embodiment provided, the desired organ to be evaluated is the liver. Illustrative examples of organs that may be evaluated by the computer 100 include, but are not limited to, the heart, the kidneys, pancreas, intestines, gall bladder, lungs and the brain. If the computer 100 is not provided with instructions or capabilities for evaluation of the specific organ of interest, the computer 100 is provided with input capability such that additional programming may be provided. Such additional programming allows for the computer 100 to use machine learning and classification algorithms to evaluate different organs not originally provided.

After choosing the organ of interest and inputting this information to the computer 100, the objective of the method and apparatus is to use the designated choice to produce an output, in usable form, that allows the professional to accurately evaluate the physical features of the organ of interest. Such outputs are, for example, a visual representation of the organ of interest. After output of the visual representation of the organ of interest by the method, a segmentation method, conventionally known, may be automatically initiated such that further evaluation of portions of the organ of interest, (i.e. hypothetical slices), can be processed.

In the exemplary embodiment of the present invention, referring to FIG. 1, a method 10 of automatically detecting organs is presented. In method step 20, a predefined set features for analysis is chosen, the predefined set of features having distinguishing weak classifiers for a machine learning and classification algorithm, wherein the predefined set of features and the weak learners chosen distinguish features of the organ desired to be represented. The predefined set of features pertain to a specific organ that is of interest.

In an exemplary embodiment, a CT device transmits powerful, but harmless waveforms, into a patient. The images produced by the device after transmission are stored in an electronic format by the CT device or by an attached computer. The resulting body scans can be difficult for professionals to read as tissue features of various organs can be similar between organs located within close proximity to one another. For the purposes of illustrative example, the CT device used in the exemplary embodiment of the present invention is a conventional CT device with the patient not receiving a dose of contrast material.

In the present invention, visual contrast pixel images from the CT scan are used for analysis such that an organ of interest is compared to a similar organ of interest that has known visual contrast pixel image values. In this way, the analysis that is performed allows for the computer to "learn" the distinguishing features of a particular organ. According to parameters chosen for allowable error, each specific point (pixel) of the scan is evaluated as being either part of a desired data set for the organ of interest or as an outlier of the data set for the organ of interest. The parameters used for identification and subsequent analysis of the data points are defined as "weak learners". The weak learner can be either a single parameter particular to an organ of interest, such as a color or pixel shading, or may be a series of parameters particular to an organ, such as a certain pixel shading adjacent to a typical edge configuration of pixels. The purpose of the weak learner is to allow the researcher to search over a large set of data or simple classification functions to find a specific feature with low error. The term weak learners is used because the returned data or classifier will correctly classify more than one half of the examples from which to choose. The weak learner, therefore, can be effective if, at least, the correct designation capability is exhibited in slightly over half of the instances of evaluation. Multiple weak learners can be designated as applicable to a specific organ of interest and the computer can use these multiple weak learners and compare the characteristics required by these weak learners to the actual data to be evaluated. The computer applies the weak learners appropriate to the evaluation data. As little as one weak learner or greater than ten thousand weak learners may be chosen for evaluation of a data set. As some weak learners (parameters) may accurately predict structural components of the organ in question, these weak learners may be altered or weighted over successive iterations of scanning over a known organ.

Referring to FIG. 1, in step 30, the weak learner or weak learners, in turn, are "boosted" such that the learners are used to solve a sequence of parameters for known organ configuration. In subsequent analysis periods, for other known data sets, the weak learners are reweighted to minimize the weak learners that incorrectly classify information. Subsequent iterations allow the evaluation technique to become more accurate over time. For close agreement between the positions identified by the weak learners and the actual organ position (for a known data set), a strong classifier is developed wherein the organ of interest has a specific correlation to the features required. By using this process, minimal error is found. Each of the strong classifiers, derived from weak learners, are incorporated into models or algorithms for the organs of interest. These algorithms are then applied to the data set of other CT scans to develop even stronger classifiers, if needed. Additional parameters that are important to the organ of interest can also be applied to the known CT data set such that additional weak learners are incorporated into the analysis over time, thereby providing a new strong classifier.

Additional iteration steps may be undertaken to help researchers find accurate solutions. For weak classifiers that are not accurate in their prediction of organ position, additional or alternate/substitute weak classifiers are chosen. For computational efficiency, selection of weak classifiers that have an initial strong correlation to known organ of interest structure require less iterations of evaluation by the algorithm to accurately predict the presence of an organ from data sets provided. An algorithm, therefore, that requires less iterative repetitions to accurately determine the distinguishing characteristics of the organ will provide a more computationally efficient model of the organ of interest. The final product of the machine, called a strong classifier, is a weighted combination of weak learners.

The use of a machine learning and classification algorithm allows the user to refine the classification capabilities produced through the use of the algorithm over time, consequently allowing more accurate results. To allow such refinement, for example, a greater number of positive or known examples are used for analysis as described above (i.e. greater than 1). In addition to the positive or known examples, negative examples may also be provided to the algorithm such that the weak learners identify patterns or features not present in the organ of interest. The algorithm is then run for a number of iterations, for example, greater than 20 times. The results obtained from algorithm are then checked against known parameters for organs with both inclusive and exclusive features used for comparison.

The strong classifier is developed through known data sets, thus the system is "trained" for automatic identification of the features present within the organ of interest. The strong classifier, however, may also be determined through conducting numerous random trials with weak classifiers and conducting extensive iterations of the algorithm.

Figure 6:
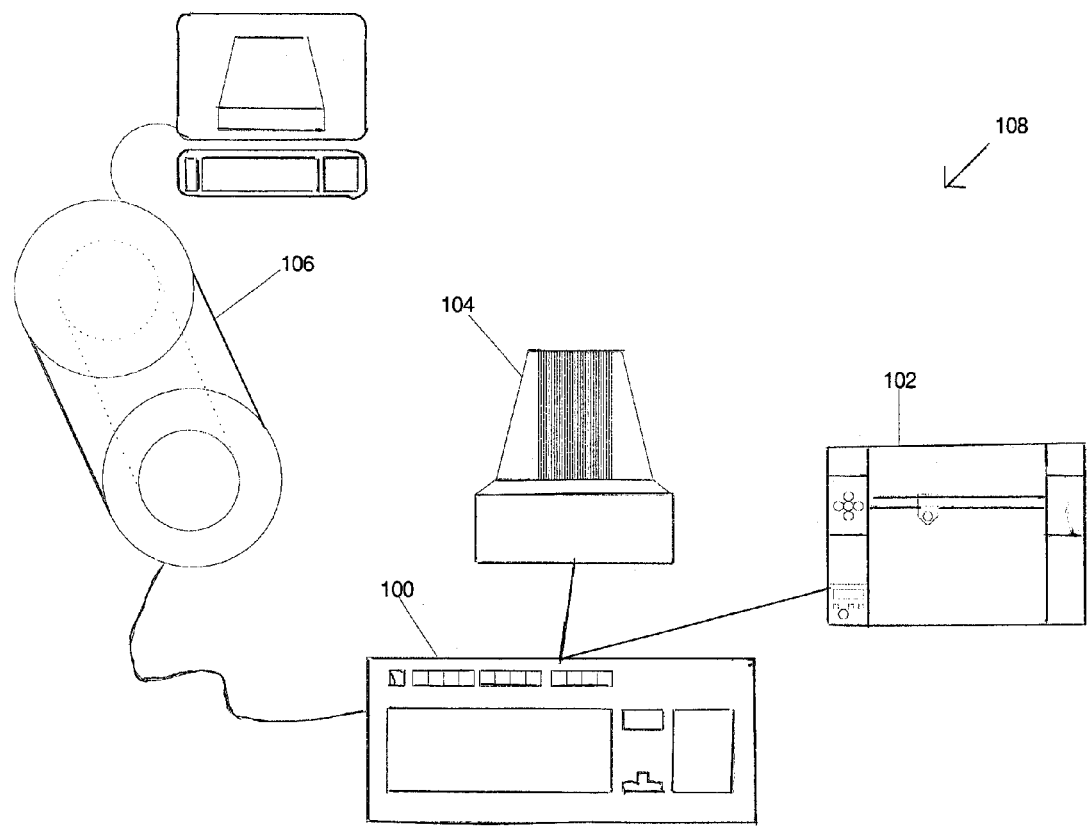
FIG. 6 is a exemplary embodiment of the arrangement for performing the method of FIG. 1.

In an exemplary embodiment of the present invention, according to FIG. 6, a computer 100 is provided with the both the algorithm and representative evaluative data sets for organs of interest. The computer 100 is programmed with knowledge provided through experience such that it is not necessary to develop specific strong classifiers for the organ desired to be evaluated. Thus, a medical professional can specify the organ of interest to the computer and the specific strong classifiers associated with the organ of interest can be immediately used with a minimum of calculation.

Referring to FIG. 1, the next method step 40 of an exemplary embodiment of the invention entails either conducting a body scan of a patient to be evaluated, or, alternatively, obtaining pre-existing body scan information from a patient.

The next method step 50 of the exemplary embodiment of the invention entails applying the strong classifier and the algorithm to the body scan data set provided in step 40 to develop a representation of the organ. The process evaluates the body scan data and determines if the individual pixels are part of the organ of interest or are extraneous to the desired organ.

Lastly, the method provides for outputting a result 60 of the applying of the strong classifier and the algorithm to the body scan data set to represent the organ. The output can be in the form of a visual representation of the organ through a computer monitor 104 or through a visual representation through a photograph. The output may also be provided in the form of binary data, for example, to allow segmentation software to segment individual sections of the organ of interest for further evaluation.

Pseudo-Code Exemplary Embodiment

The algorithm used in the present invention is the Adaboost algorithm that allows for subsequent evaluation of data sets. An exemplary section of pseudo-code of the Adaboost algorithm is provided below:

| General pseudo-code for Adaboost. |
| --- |
| Given $\{(x_i, y_i)\}_{i \in [1, m]}$, where $x_1 \in X$, $y_i \in \{-1, +1\}$, |
| Initialize $D_1(i) = \dfrac{1}{m}$, $\forall\, i \in [1, m]$ |
| for t = 1 to T, <br>   Train weak learner $h_t^k$ for each feature k using distribution $D_i$, <br>   For each weak hypothesis $H_t^k\, X \mapsto \{-1, +1\}$, compute the error rate <br>   $\in_t = \Sigma_{i/h_t(i) \neq y_i} D_t(i)$, <br>   Choose the weak learner $h_t^{k_0}$ that has the minimum error rate, <br><br>   Choose $\alpha_t = \dfrac{1}{2} \ln \dfrac{1 - et}{et}$, <br><br>   Update $D_{t+1}(i) = \dfrac{D_t(i)}{Z_{t+1}} \times \begin{cases} e^{-\alpha_t} & \text{if } h_t(x_i) = y_i \\ e^{\alpha_t} & \text{if } h_t(x_i) \neq y_i \end{cases}$ <br><br>   where $Z_{t+1}$ is a normalizing constant so that $D_{t+1}$ sums up to 1. <br> end <br> return      $H(x) = \Sigma_{t=1}^{T} \alpha_t h_t(x)$ |

As provided above, the Adaboost code takes a given set of x and y parameters. An initialization of a data structure then occurs. Weak learners for a designated number of features (provided as h) are then trained for each individual feature k that is representative of the organ of interest. For accuracy in calculation, a distribution Di is used for the training.

The next step for the Adaboost algorithm is that an error rate is computed for the individual weak learners that are applied to data to be evaluated. The error values for the individual weak learners are then compared amongst other individual weak learners and the weaker learners that have the minimum error rate are identified by the algorithm. A new initialization of a data structure is then performed, based upon the previous data structure incremented by a normalizing constant. Weak learners, thereafter, are subsequently trained for each feature so that the weak learners are more representative of the organ of interest based upon the previously error minimized weak learner. Iterations are continued until the weak learners that are trained are more predictive of the distinguishing feature (i.e. the error used is minimized). Over subsequent iterations, the weak learners with a specific updated adjustment factor can be summed. The summation of the weak learners results in a strong classifier H(x) representative of the organ of interest. The strong classifier H(x) may then be used on unknown data sets and comparisons is made between the features of the strong classifier H(x) and the data to be evaluated.

Referring to FIGS. 2, 3, 4 and 5, a point in three dimensional space is defined as the intersection of three orthogonal planes. As presented, the point in three dimensional space chosen can be defined (redefined) in a new coordinate system. To this end, a point in three dimensional space of a hypothetical point (x, y, z) is redefined as the intersection of three orthogonal planes. Classification is then performed on three two dimensional planes and the point is classified depend upon the classification results for each of the planes. Thus, each point can be evaluated in three different orthogonal planes and the data set updated with the results of the analysis. In the present exemplary embodiment, local histograms of three intersecting planes are used for classification of the organs.

The Adaboost code allows for detection of simple features, such as oriented edges or color. Adaboost, however, also allows for measuring how these features are related to one another, thereby allowing similarities between different features or patterns for the individual organ of interest. Finding such patterns allows for determination of complex features that provide a high resolution capability of the system.

Referring to FIG. 6, an exemplary embodiment of an arrangement 108 of conducting analysis of data for automatic selection of organs based upon machine learning and classification algorithms is presented. the computer 100 for the analysis of the data sets is illustrated. The computer 100 is provided with an input capability to allow information, such as CT scans, to be accepted and processed by the strong classifier. Desired input capability can be performed through a graphical user interface (GUI). The computer 100 also is connected to a single or multiple output devices 102, 104. In the illustrated embodiment of the present invention, the output devices are a printer 102 and a monitor 104. The computer 100 is connected to a data source input, in this case, an CT machine 106.

The present invention provides for an advantage compared to conventional technologies that the method automatically determines the presence of an organ whereby the similarity of anatomical features of an individual are accurately analyzed.

The present invention also provides for a significant advantage compared to conventional technologies wherein the present invention that it has the capability to represent organs of interest in both a three dimensional space and in two dimensional space over periods of time.

The present invention provides a single scanning system that is sufficient to accurately scan multiple organs with sufficient clarity without the need for multiple systems for a patient.

The present invention also provides a single scanning system that allows for visual interpretation of results allowing doctors and/or technicians to evaluate scans.

MRI systems using total imaging matrix technology may be used in conjunction with the present invention. Additionally, MRI systems with alternating, changeable or composite coil systems and motion detection/compensation systems may be used in conjunction with the method and system of the present invention. Other types of scanning may be used and are applicable to use with the method of the present invention. These types of scanning include, for example, x-ray or ultrasound scanning.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method of visually depicting an organ for processing two dimensional and three dimensional medical images or medical image data sets, comprising:

(a) choosing a predefined set features for analysis, the predefined set of features having distinguishing weak learners for an algorithm, wherein the predefined set of features and the weak learners chosen distinguish features of the organ desired to be represented;

(b) developing a strong classifier for the algorithm for the organ desired to be represented based upon the weak learners for the organ;

(c) one of conducting a body scan to produce a body scan data set and obtaining a body scan data set of information for a patient;

(d) applying the strong classifier and the algorithm to the body scan data set to develop a result of a representation of the organ; wherein the step of applying the strong classifier and the algorithm to the body scan data set to develop a representation of the organ is conducted on at least one point, wherein each point is defined as an intersection of three orthogonal planes in the three dimensional data set developed from the body scan data set; and (e) outputting the result of the step of applying of the strong classifier and the algorithm to the body scan data set to represent the organ.

2. The method according to claim 1, wherein the predefined set of features is a set of linear filters.

3. The method according to claim 2, wherein the linear filters are one of Local Binary Patterns, linear rectangular filters and intensity histograms.

4. The method according to claim 1, wherein the step of choosing a predefined set features for analysis comprises: selecting a filter based on the organ of interest; and selecting a weak learner associated with the filter.

5. The method according to claim 1, wherein the step of applying the strong classifier and the algorithm to the body scan data set to develop a representation of the organ is conducted on one of a two dimensional data set developed from the body scan data set and a three dimensional data set developed from the body scan data set.

6. The method according to claim 1, wherein the algorithm is one of a machine learning and classification algorithm and an Adaboost algorithm.

7. The method according to claim 1, wherein the strong classifier is defined as a weighted sum of the weak learners.

8. The method according to claim 1, wherein the strong classifier is applied on three two dimensional planes.

9. The method according to claim 1, further comprising: inputting the organ to be represented using the predefined set of features designated as weak learners to develop the strong classifier after the step of developing the strong classifier for the algorithm for the organ desired to be represented based upon the weak classifiers for the organ.

10. The method according to claim 1, wherein the organ includes one of carotids, heart vessels, liver vasculature and femoral artery.

11. The method according to claim 1, wherein the step of outputting the result of the step of applying of the strong classifier and the algorithm to the body scan data set to represent the organ produces a visual image.

12. The method according to claim 11, wherein the visual image is a three dimensional visual image.

13. The method according to claim 11, wherein the visual image is a two dimensional image changing over time.

14. The method according to claim 1, wherein the representation is cropped for visualization.

15. The method according to claim 1, further comprising: initializing a segmentation algorithm for analysis of the organ.

16. The method according to claim 1, wherein the weak classifiers are determined through analysis of one of visual scans of known organs and data scans of known organs as positive indicators.

17. A non-transitory computer readable storage medium tangibly embodying a program of instructions executable by a computer to perform method steps for visually depicting an organ, comprising:

(a) choosing a predefined set features for analysis, the predefined set of features having distinguishing weak learners for an algorithm, wherein the predefined set of features and the weak learners chosen distinguish features of the organ desired to be represented;

(b) developing a strong classifier for the algorithm for the organ desired to be represented based upon the weak learners for the organ;

(c) one of conducing a body scan to produce a body scan data set and obtaining a body scan data set of information for a patient;

(d) applying the strong classifier and the algorithm to the body scan data set to develop a result of a representation of the organ; wherein the step of applying the strong classifier and the algorithm to the body scan data set to develop a representation of the organ is conducted on at least one point, wherein each point is defined as an intersection of three orthogonal planes in the three dimensional data set developed from the body scan data set; and (e) outputting the result of the step of applying of the strong classifier and the algorithm to the body scan data set to represent the organ.

18. The method according to claim 1, wherein each point is classified upon classification with respect to the three orthogonal planes.

* * * * *